C. A. RAGGIO.
REFUSE BOX.
APPLICATION FILED FEB. 23, 1910.

993,794.

Patented May 30, 1911.

Witnesses:
Ephraim Banning
Frances M. Frost

Inventor:
Charles A. Raggio.
BY Banning & Banning
Attorneys.

UNITED STATES PATENT OFFICE.

CHARLES A. RAGGIO, OF CHICAGO, ILLINOIS, ASSIGNOR OF ONE-HALF TO LOUIS G. RAGGIO, OF CHICAGO, ILLINOIS.

REFUSE-BOX.

993,794.

Specification of Letters Patent.   Patented May 30, 1911.

Application filed February 23, 1910.  Serial No. 545,267.

*To all whom it may concern:*

Be it known that I, CHARLES A. RAGGIO, a citizen of the United States, residing at Chicago, in the county of Cook and State of Illinois, have invented certain new and useful Improvements in Refuse-Boxes, of which the following is a specification.

This invention relates to a refuse or waste box intended for use in locations where the ordinary refuse box is used.

It has for its objects, to provide a box which will be more substantial than the ordinary type; one which will not be subject to deterioration from the acids and decomposed matter usually accompanying refuse and similar material; one from which the materials may be easily removed; one which may easily be cleaned out by flushing with water, or in any suitable manner; one which will tend at all times to remain closed, thereby insuring greater cleanliness of the surrounding property and preventing the emission of foul odors; one which will be cheap of construction; and one which will be light and of sufficient stiffness and rigidity so that it can be easily transported without danger of injury.

Other objects and uses will appear from a detailed description of the invention, which consists in the features of construction and combination of parts hereinafter described and claimed.

Figure 1:
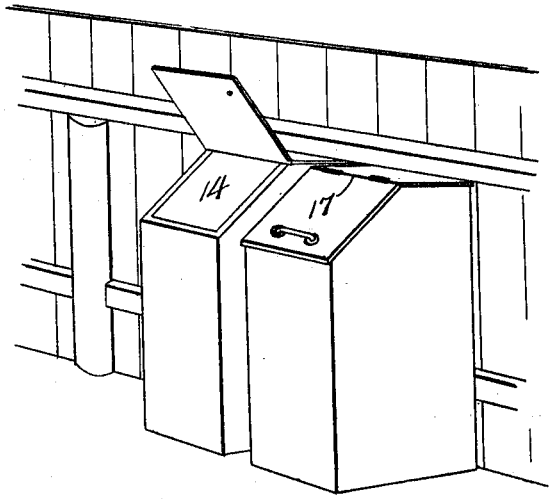
Figure 2:
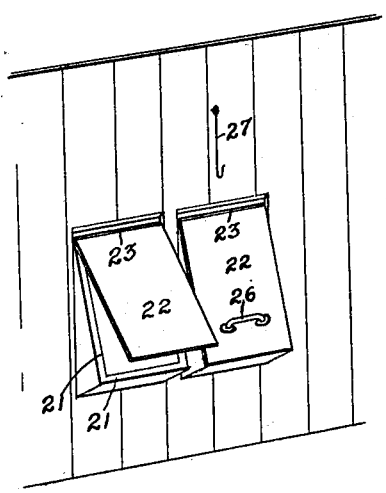
Figure 3:
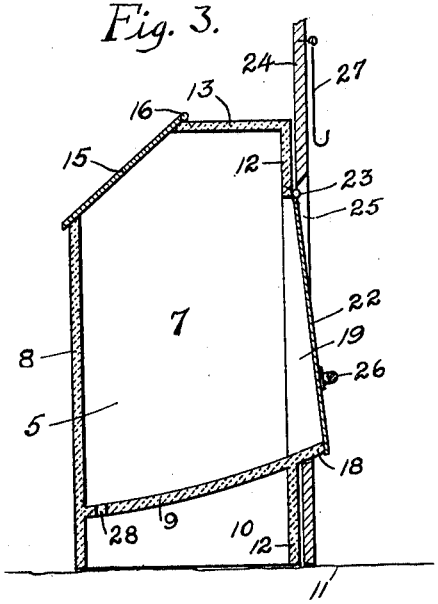
Figure 4:
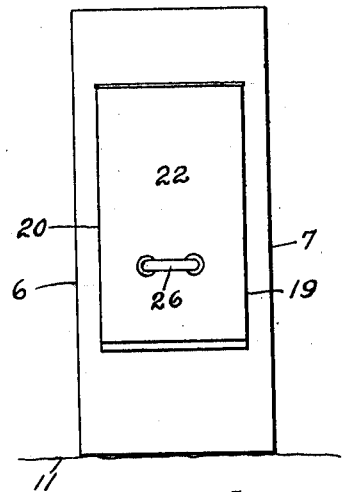

In the drawings, Figure 1 shows in perspective a pair of my improved refuse boxes as they will appear from the yard side of an alley fence, the cover of one of the boxes being shown raised and the other closed; Fig. 2 shows in perspective the alley side of a pair of my improved boxes, the cleaning opening or door of one of the boxes being closed and that of the other in open or raised position; Fig. 3 shows a cross section taken through one of my improved boxes, showing it set against a fence in working position, both of the openings being closed; and Fig. 4 shows a rear view of one of my boxes, the cleaning opening being shown in closed position.

In its preferred form, it is intended that my improved box shall be made of reinforced concrete, or any similar sanitary material, and preferably one which shall be impervious to moisture and shall not be chemically acted upon by the refuse which it is intended to contain.

In the figures, a box portion 5 is provided with side walls 6 and 7 and a front wall 8, but the bottom 9 is of such form that the materials will tend to collect near the front wall 8. To this end, I prefer to make the bottom 9 in the form of a false bottom, the space 10 being open to the ground 11. A rear wall 12 acts in conjunction with the side walls 6 and 7 and the front wall 8 to form a square base adapted to rest on the ground 11, thus forming a firm and even foundation for the box. The top 13 is formed in the usual manner so as to provide an opening 14 adapted to be closed by a cover 15, which may be of iron, steel, or any other suitable material. The cover 15 is preferably attached to the top by means of eyes 16 secured to the box material by being cast therein, or in any other desired manner, a rod 17 being passed through the eyes 16 and a loop formed in the upper portion of the cover 15.

In forming the rear portion of my improved box, I provide a lip 18, preferably formed integral with the body portion; and this lip 18 acts in conjunction with projections 19 and 20, which extend rearwardly from the body portion to form a cleaning opening, of which the edge 21 projects outwardly and downwardly so that the cleaning door 22, hinged at 23, will always tend to remain closed against the edge 21, by reason of its own weight.

The cleaning opening, constituting the lip 18, projections 19 and 20, and the door 22, are adapted to project outwardly on the alley side of the fence 24, through an opening 25 therein, the opening 25 being of a size and shape to permit the door 22 to be swung upwardly to the necessary amount for cleaning purposes. The door 22 is preferably provided with a handle 26 to facilitate opening it, and a hook 27 may be connected to the fence, or to any suitable object, so that the door 22 can be hooked in open position during cleaning processes.

The bottom 9 is preferably provided, near its forward and lower end, and adjacent to the wall 8, with one or more holes 28 connecting the interior of the box with the space 10. These holes are intended to allow liquids and moisture collecting in the box to run toward the front wall and drop down through the space 10 on to the ground, thereby at all times keeping the box dry and free from undesirable liquids and moisture.

It is seen that my improved construction of refuse box is simple, but that it is so constructed that it will at all times be well drained, thereby remaining free from moisture, and thus improving the sanitary conditions surrounding it. In fact, one of the most undesirable features usually associated with a refuse box is the fact that it is generally water soaked or else soaked with moisture which renders it unsanitary and difficult to clean. It is furthermore seen that the arrangement of the lip 18 and the projections 19 and 20 are such that the door 22 will always tend to remain closed, on account of its own weight, and for this reason, the quantity of foul odors passing from the box will be reduced. It has always been difficult heretofore in the construction of such a box to provide means whereby the door will remain closed, it being evident that a door which hangs vertically will easily swing outward in case the box does not set exactly on the level, and it will also swing outward under the influence of wind. On the other hand, my device is adapted at all times to remain closed. The arrangement of the lip 18 is also such that the opening between the rear of the box and the fence will not become filled with refuse materials, inasmuch as the lip will prevent them from falling down between the box and the fence.

The lip 18, in conjunction with the sloping bottom in the box, is found to greatly facilitate the cleaning out process, for the materials will readily collect against the side of the box opposite to the cleaning opening, so that they can be freely shoveled out, and the lip will prevent the materials from falling down between the box and the fence, thereby rendering it unnecessary to use the same amount of care in the cleaning out process as is now necessary.

I claim:

1. A self-contained receptacle, of the class described, of substantially rectangular box like formation provided with a bottom extending backwardly and upwardly from its front wall past its back wall, and further provided in its upper forward portion with an inlet opening for garbage and a cover for the same, and provided in its rear portion with an extension chamber provided with triangular side walls offset from the side walls of the receptacle and extending outwardly and downwardly from the rear wall of the receptacle, commencing at a point near the top of the receptacle and uniting at their lower ends with the rear portion of the bottom thereof which slants upwardly and outwardly past the rear wall to form a projecting lip for the receptacle and floor for the extension chamber, a door hinged at its upper end to the rear wall of the receptacle near the point where the extension walls commence and adapted to fall by gravity and remain in facial contact with the edges of the extension walls and of the projecting lip portion of the floor of the extension chamber, substantially as described.

2. A self-contained receptacle of the class described, of substantially rectangular box like formation, provided with a bottom extending backwardly and upwardly from its front wall past its back wall, and further provided in its upper forward portion with an inlet opening for garbage and a cover for the same, and provided in its rear portion with an extension chamber provided with triangular side walls offset from the side walls of the receptacle and extending outwardly and downwardly from the rear wall of the receptacle, commencing at a point near the top of the receptacle and uniting at their lower ends with the rear portion of the bottom thereof which slants upwardly and outwardly past the rear wall to form a projecting lip for the receptacle and floor for the extension chamber, a door hinged at its upper end to the rear wall of the receptacle near the point where the extension walls commence and adapted to fall by gravity and remain in facial contact with the edges of the extension walls and of the projecting lip portion of the floor of the extension chamber there being a drain hole in the forward lower portion of the bottom to provide drainage communication from the interior of the receptacle to the ground beneath, substantially as described.

CHARLES A. RAGGIO.

Witnesses:
EPHRAIM BANNING,
THOMAS A. BANNING, Jr.

---

Copies of this patent may be obtained for five cents each, by addressing the "Commissioner of Patents, Washington, D. C."